UNITED STATES PATENT OFFICE 2,019,915

COMPLEX METAL COMPOUNDS OF AZO DYESTUFFS AND THEIR PRODUCTION

Hans Krzikalla and Karl Holzach, Ludwigshafen-on-the-Rhine, Germany, assignors to General Aniline Works, Inc., New York, N. Y., a corporation of Delaware No Drawing. Application June 30, 1933, Serial No. 678,543. In Germany July 16, 1932

4 Claims. (Cl. 260—12)

The present invention relates to new complex chromium compounds of azo dyestuffs and a process of producing same.

We have found that valuable complex metal compounds of azo dyestuffs are obtained by treating with agents supplying metals such azo dyestuffs as are obtainable by coupling diazotized ortho-aminophenols or ortho-aminonaphthols which contain at least a substituent selected from the class consisting of halogen, the nitro and the sulpho group, with a tetrahydro-beta-naphthol. Particularly suitable artho-aminophenols are those containing several of the substituents already mentioned. Still further substituents may be present, if desired. Suitable coupling components are tetrahydro-beta-naphthol itself (corresponding to the formula

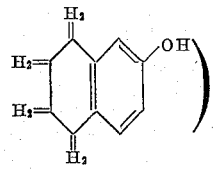

and derivatives thereof such as 2-hydroxy-tetrahydronaphthalene-3-sulphonic acid. As suitable agents supplying metals may be mentioned those supplying chromium, copper, iron, nickel, cobalt, manganese, titanium and vanadium. The dyestuffs may be employed for various purposes, for example for lacquering purposes and the like. The dyestuffs may be subjected to the said treatment in substance or on the fibre.

The following examples will further illustrate the nature of this invention but the invention is not restricted to these examples. The parts are by weight.

Example 1

23.4 parts of 4-nitro-2-aminophenol-6-sulphonic acid are diazotized in the usual manner with 25 parts of hydrochloric acid of 19° Bé. strength and 7 parts of sodium nitrite, the resulting diazo solution being allowed to run slowly into an ice-cold solution of 15 parts of tetrahydro-beta-naphthol, 30 parts of sodium carbonate and 16 parts of caustic soda solution of 40° Bé. strength in about 200 parts of water. The mixture is stirred at from 5° to 10° C. until the formation of dyestuff is completed and the dyestuff is salted out with solid common salt. The new dyestuff dyes wool brown shades; by after-chroming, the dyeing yields coffee-brown shades fast to washing, fulling and light. By boiling the dyestuff in substance with chromium salts, as for example chromium formate, chromium fluoride or chromium sulphate, a complex chromium compound is obtained which when dyed on wool levels very well and yields a fast dark brown dyeing. It is also suitable for dyeing leather or silk. The corresponding chromium compound obtained by employing 6-nitro-2-aminophenol-4-sulphonic acid yields similar dyeings.

Example 2

19.9 parts of picramic acid (4,6-dinitro-2-amino-1-hydroxy-benzene) are dissolved in 300 parts of water and 5.4 parts of sodium carbonate while warming. The solution is then cooled and diazotized in the usual manner with 7 parts of sodium nitrite and 30 parts of hydrochloric acid of 19° Bé. strength. The diazo compound is then coupled with an alkaline solution of 16 parts of tetrahydro-beta-naphthol as described in Example 1. When the coupling is completed, the reaction mixture is heated for a short time at from 40° to 50° C. Then the dyestuff is salted out and filtered by suction. The filter residue is suspended in a mixture of about 400 parts of alcohol and 90 parts of a solution of chromium formate containing 8.6 parts of $Cr_2O_3$ and 13.6 parts of formic acid and heated for 2 hours in an autoclave at 110° C. After the treatment with chromium the dyestuff is dissolved to the greater part. It is precipitated by the addition of water, filtered by suction and washed. After drying a black powder is obtained which dissolves very well in alcohol and may be employed for spirit varnishes. The dyestuff is also suitable for varnish lacquers and yields, when using 2 grams of dyestuff per liter of varnish lacquer, olive, and when using 10 grams of dyestuff per liter, deep black colorings very fast to light and weather.

The chroming may also be carried out in the absence of a solvent or in aqueous alkaline solution by boiling with alkaline chromite solutions.

The copper compound of the dyestuff may be obtained by heating the original dyestuff with a solution of tetramine cupric sulphate or of copper acetate. By using the copper compound, varnish lacquers may be colored a copper-red shade fast to light. The compounds of the dyestuff with other metals, as for example iron, nickel, cobalt, manganese, titanium and vanadium may be prepared in a similar manner. The valuable metal compounds thus obtainable are readily soluble in alcohols and dye cellulose lacquers reddish brown to dark brown shades.

Example 3

19.9 parts of picramic acid are diazotized as described in Example 2 and coupled with 25 parts of 2-hydroxytetrahydronaphthalene-3-sulphonic acid (corresponding to the formula

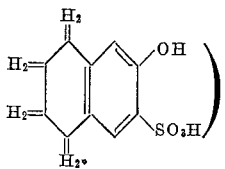

in a solution rendered alkaline with sodium carbonate. The salted out dyestuff dyes wool brown shades which change to a fast olive by after-chroming on the fibres. The complex chromium compound prepared in substance gives similar dyeings.

4-nitro-2-aminophenol-6-sulphonic acid, with the same coupling component, yields a dyestuff which dyes wool brown shades which change to a fast reddish-brown by after-chroming.

*Example 4*

29 parts of nitrated 1-diazo-2-naphthol-4-sulphonic acid are introduced into an alkaline solution of 16 parts of tetrahydro-beta-naphthol. As soon as the coupling is completed, the dyestuff formed is salted out and filtered off by suction. After drying, a dark powder is obtained which dyes wool brown shades which change by after-chroming into a fast dark-brown. A similar dyeing is obtained by dyeing the dyestuff in the presence of ammonium bichromate.

*Example 5*

15.4 parts of 5-nitro-2-aminophenol are diazotized in the usual manner and the solution of the diazo compound is caused to flow into an alkaline solution of 16 parts of tetrahydro-beta-naphthol. After the coupling is completed the mixture is heated to from 40° to 50° C. and the reaction product is salted out. The precipitate is filtered off by suction and chromed as described in Example 2. The dyestuff obtained is readily soluble in nitrocellulose lacquer and yields dyeings of grey to black shades fast to light.

The dyestuff containing chromium obtained in a similar manner from diazotized 4-chlor-2-aminophenol and tetrahydro-beta-naphthol dyes nitrocellulose lacquer Bordeaux red shades.

What we claim is:—

1. The process of producing complex metal compounds of azo dyestuffs, which comprises treating with an agent supplying a complex-forming metal an azo dyestuff obtainable by coupling a diazotized aromatic amine hydroxylated in ortho-position to the amino group, the said amine being selected from the group consisting of ortho-aminophenol and ortho-aminonaphthol and containing at least a negative substituent selected from the class consisting of halogen, the nitro and the sulpho group, with a tetrahydro-beta-naphthol.

2. Complex metal compounds of azo dyestuffs obtainable by coupling a diazotized ortho-aminophenol which contains at least a negative substituent selected from the class consisting of halogen, the nitro and the sulpho group, with a tetrahydro-beta-naphthol.

3. Complex chromium compounds of azo dyestuffs obtainable by coupling a diazotized ortho-aminophenol which contains at least a negative substituent selected from the class consisting of halogen, the nitro and the sulpho group, with a tetrahydro-beta-naphthol.

4. The complex chromium compound of the azo dyestuff obtainable by coupling diazotized 4,6 - dinitro - 2 - amino-1-hydroxybenzene with tetrahydro-beta-naphthol.

HANS KRZIKALIA.
KARL HOLZACH.